United States Patent [19]

Tezuka

[11] Patent Number: 4,724,724
[45] Date of Patent: Feb. 16, 1988

[54] SYSTEM FOR CONTROLLING LINE PRESSURE OF A CONTINUOUSLY VARIABLE TRANSMISSION FOR A MOTOR VEHICLE

[75] Inventor: Kazunari Tezuka, Asaka, Japan

[73] Assignee: Fuji Jukogyo Kabushiki Kaisha, Tokyo, Japan

[21] Appl. No.: 61

[22] Filed: Jan. 2, 1987

[30] Foreign Application Priority Data

Jan. 8, 1986 [JP] Japan ................... 61-1777

[51] Int. Cl.⁴ .................. B60K 41/18; B60K 41/12
[52] U.S. Cl. .................. 74/866; 364/424.1; 192/0.075
[58] Field of Search ........... 74/866; 364/424.1; 192/0.048, 0.075, 0.076

[56] References Cited

U.S. PATENT DOCUMENTS

| 4,466,521 | 8/1984 | Hattori et al. | 74/866 X |
| 4,542,665 | 9/1985 | Yamamuro et al. | 74/866 |
| 4,610,183 | 9/1986 | Nobumoto et al. | 74/866 |
| 4,665,773 | 5/1987 | Hiramatsu et al. | 74/866 |
| 4,671,138 | 6/1987 | Nobumoto et al. | 364/424.1 X |

FOREIGN PATENT DOCUMENTS 55-65755 5/1980 Japan.
60-73160 4/1985 Japan.

Primary Examiner—Leslie Braun
Assistant Examiner—Dirk Wright
Attorney, Agent, or Firm—Martin A. Farber

[57] ABSTRACT

A control system for a motor vehicle provided with a continuously variable transmission and with an electromagnetic clutch for transmitting torque of an engine to the transmission. The transmission has a line pressure control valve having ports and a spool, a hydraulic circuit for supplying oil to the line pressure control valve so as to shift the spool to control the line pressure. When the clutch is slipping at the start of the vehicle, the line pressure control valve is controlled in accordance with a clutch transmitting torque. When the clutch is engaged, the control valve is controlled in accordance with an engine torque.

4 Claims, 4 Drawing Figures

SYSTEM FOR CONTROLLING LINE PRESSURE OF A CONTINUOUSLY VARIABLE TRANSMISSION FOR A MOTOR VEHICLE

BACKGROUND OF THE INVENTION

The present invention relates to a control system for a continuously variable belt-drive automatic transmission for a motor vehicle, and more particularly to a system for controlling line pressure of the transmission.

A known continuously variable belt-drive transmission (Japanese Patent Laid Open No. 55-65755) for a motor vehicle comprises an endless belt running over a drive pulley and a driven pulley. Each pulley comprises a movable conical disc which is axially moved by a fluid operated servo device so as to vary the running diameter of the belt on the pulleys in dependence on driving conditions. The system is provided with a hydraulic circuit including a pump for supplying oil to servo device, a line pressure control valve and a transmission ratio control valve. Each valve comprises a spool to control the oil supplied to the servo devices. The transmission ratio control valve operates to decide the transmission ratio in accordance with the opening degree of a throttle valve of an engine and the speed of the engine.

In a conventional electronic control system (Japanese Patent Laid Open No 60-73160), a drive pulley speed sensor, a driven pulley speed sensor, an engine speed sensor and a throttle position sensor are provided. Actual transmission ratio (i) is calculated by a calculator based on the output signals ($N_P$) of the drive pulley speed sensor and the output signal ($N_S$) of the driven pulley speed sensor with a formula ($i = N_P/N_S$). Desired transmission ratio (id) is calculated based on the output signal ($N_S$) of the driven pulley speed sensor and the output signal ($\theta$) of the throttle position sensor. The actual transmission ratio i is controlled to the desired transmission ratio id by shifting the spool of the transmission ratio control valve.

On the other hand, engine torque $T_e$ is calculated based on the output signal $\theta$ of the throttle position sensor and an output signal Ne of the engine speed sensor. Necessary line pressure $P_{LU}$ is decided by the actual transmission ratio i. Further, desired line pressure $P_L$ is decided by the engine torque Te and necessary line pressure $P_{LU}$ ($P_L = P_{LU} \times Te$). However, the output of the engine is transmitted through a clutch. Accordingly, the line pressure should be obtained in accordance with the clutch transmitting torque Tc ($P_L = P_{LU} \times Tc$). In such a system, in slipping conditions of the clutch at the start of the vehicle, the line pressure decided by the engine torque becomes higher than an actually necessary line pressure, which causes disadvantages such as losses of operations of the pump and pulley, reduction of starting characteristic of the vehicle, and others.

SUMMARY OF THE INVENTION

The object of the present invention is to provide a system which controls the line pressure in accordance with clutch engaging conditions, thereby eliminating the above described problems in the conventional system.

The system of the invention has a drive pulley including a hydraulically shiftable disc and a first hydraulic cylinder for shifting the disc, a driven pulley including a hydraulically shiftable disc and a second hydraulic cylinder for operating the disc, a belt engaged with both pulleys, a transmission ratio control valve having ports and a spool, a line pressure control valve having ports and a spool, a first hydraulic circuit having a pump for supplying oil to the first and second cylinders through the line pressure control valve and the transmission ratio control valve, the system comprising.

According to the present invention, there is provided a system comprising a clutch for transmitting torque of an engine to the transmission, first means for shifting the spool of the line pressure control valve in dependence on operating conditions of the engine so as to provide a line pressure, an engine speed sensor for producing an engine speed signal dependent on speed of the engine, second means responsive to the engine speed signal for producing an engine torque signal dependent on output torque of the engine, third means for producing a clutch torque signal dependent on transmitting the torque of the clutch, detecting means for detecting engaging conditions of the clutch and for producing a clutch slipping signal when the clutch slips and producing a clutch engaging signal when the clutch is engaged, selector means responsive to the clutch slipping signal for applying the clutch torque signal to the first means and responsive to the clutch engaging signal for applying the engine torque signal to the first means, whereby the line pressure is controlled in accordance with the engaging conditions of the clutch.

The other objects and features of this invention will be apparently understood from the following description with reference to the accompanying drawings.

DETAILED DESCRIPTION OF THE PREFERRED EMBODIMENT

Figure 1:
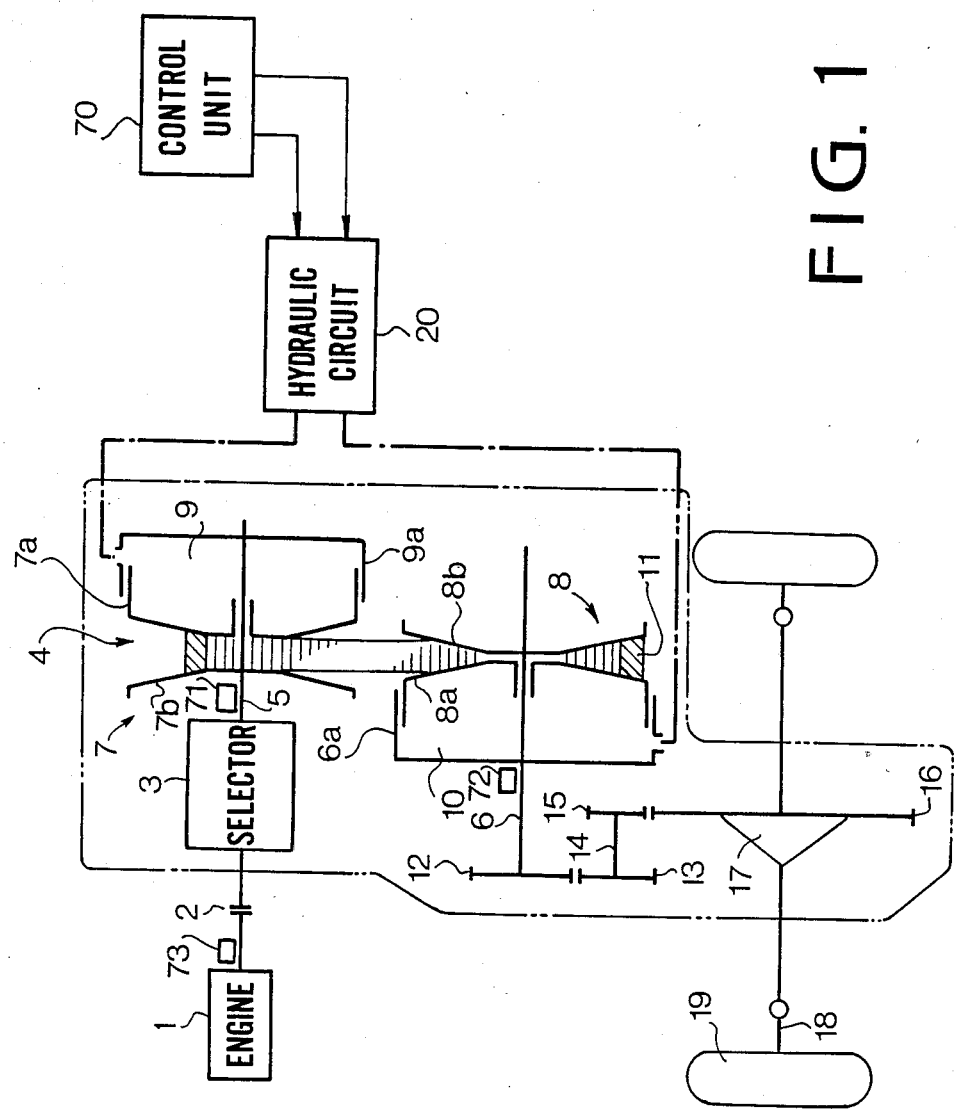
FIG. 1 is a schematic illustration of a continuously variable belt-drive transmission.

Referring to FIG. 1, a motor vehicle is provided with an engine 1, an electromagnetic powder clutch 2 for transmitting the power of the engine to a continuously variable belt-drive transmission 4 through a selector mechanism 3.

The belt-drive transmission 4 has a main shaft 5 and an output shaft 6 provided in parallel with the main shaft 5. A drive pulley (primary pulley) 7 and a driven pulley (secondary pulley) 8 are mounted on shafts 5 and 6 respectively. A fixed conical disc 7b of the drive pulley 7 is integral with main shaft 5 and an axially movable conical disc 7a is axially slidably mounted on the main shaft 5. The movable conical disc 7a also slides in a cylinder 9a formed on the main shaft 5 to provide a servo device. A chamber 9 of the servo device communicates with a hydraulic circuit 20.

A fixed conical disc 8b of the driven pulley 8 is formed on the output shaft 6 opposite a movable conical disc 8a. The conical disc 8a has a cylindrical portion which is slidably engaged in a cylinder 6a of the output shaft 6 to form a servo device. A chamber 10 of the servo device is also communicated with control circuit 20. A drive belt 11 engages with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages with a final gear 16. The rotation of the final gear 16 is transmitted to axles 18 of vehicle driving wheels 19 through a differential 17.

Figure 2A:
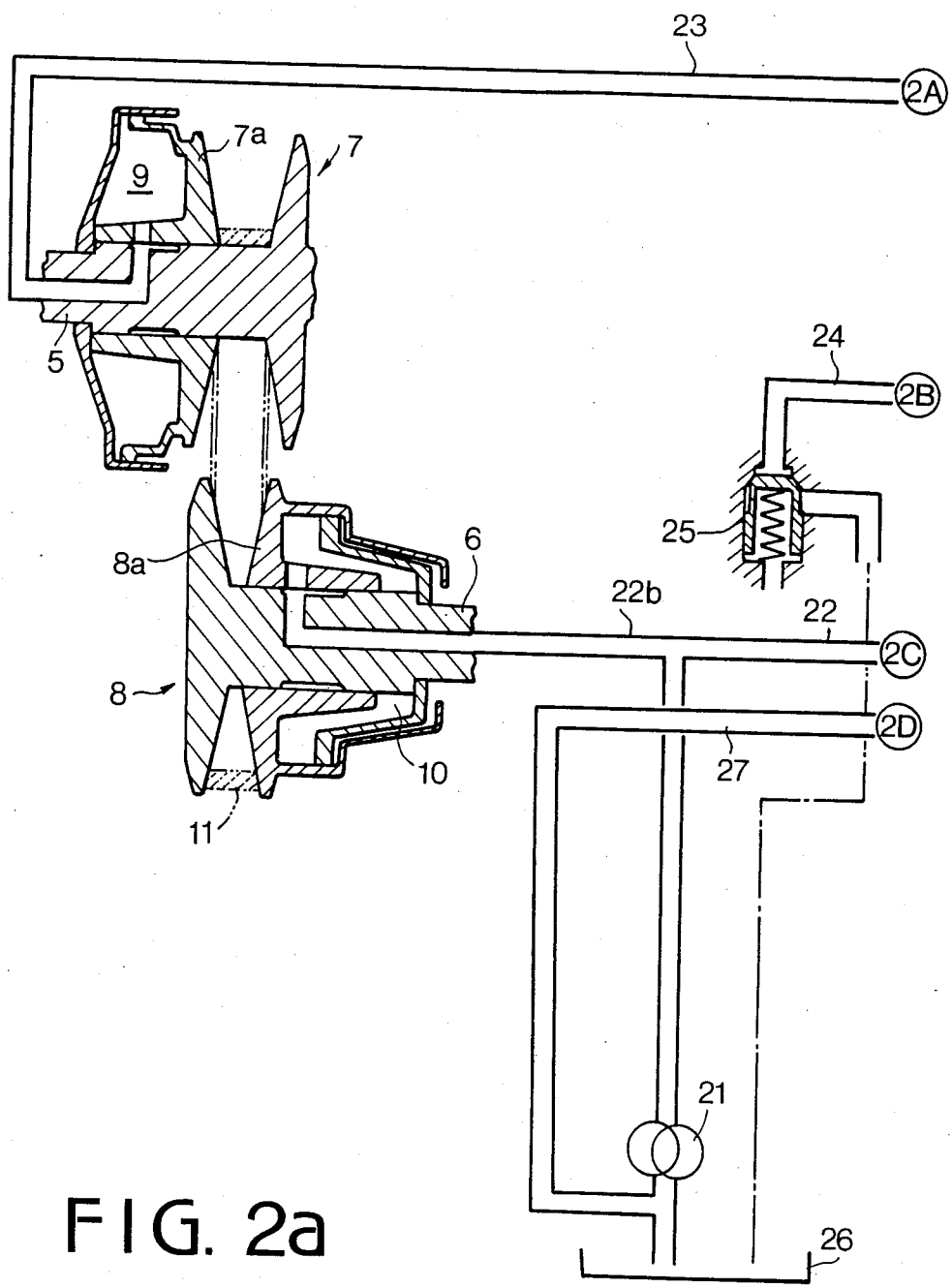
FIGS. 2a and 2b are schematic diagrams showing a control system according to the present invention.
Figure 2B:
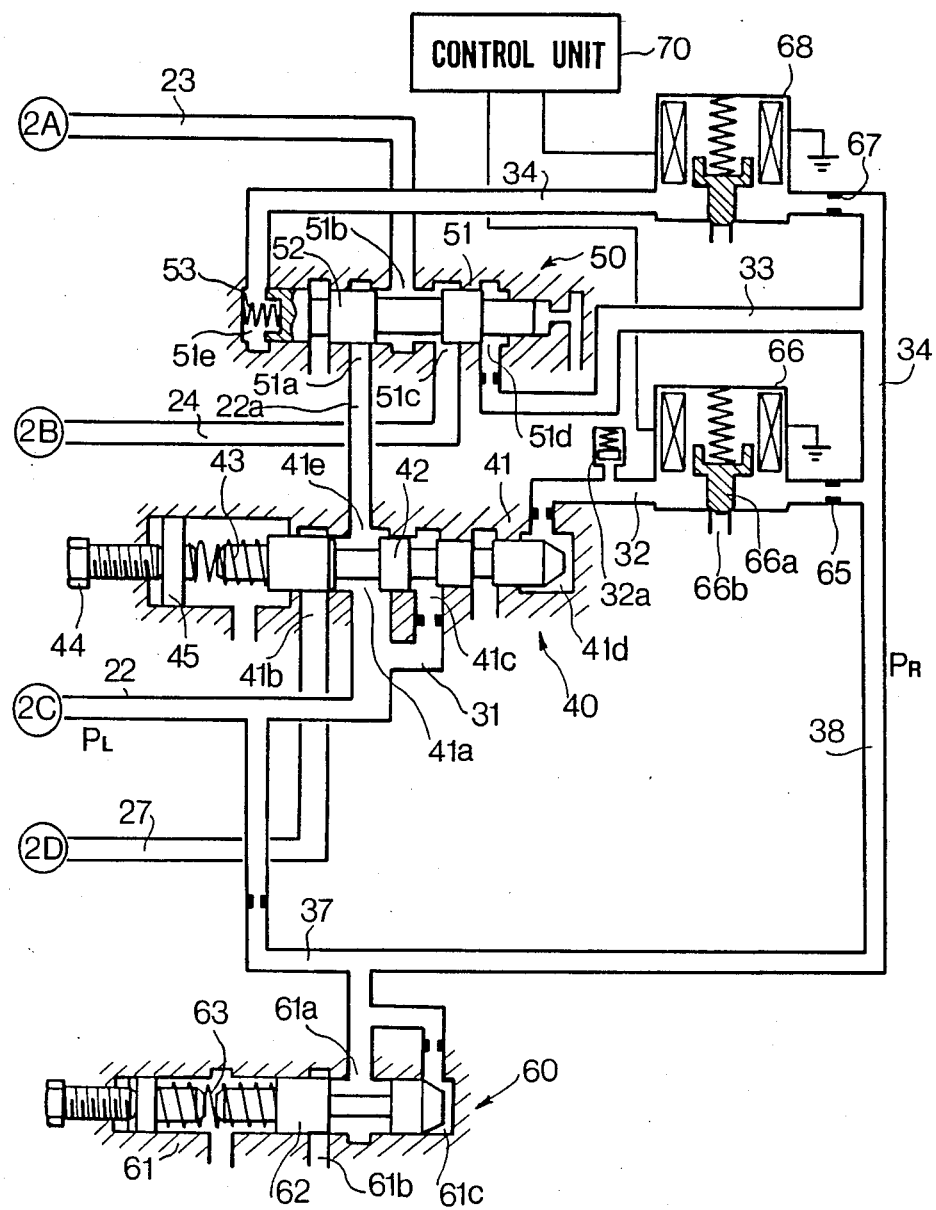

Referring to FIGS. 2a and 2b, chamber 9 of the drive pulley 7 is supplied with pressurized oil by an oil pump 21 from an oil reservoir 26, passing through a line pressure conduit 22, ports 41a and 41e of a line pressure control valve 40, transmission ratio control valve 50, and conduit 23. The chamber 10 of driven pulley 8 is applied with pressurized oil through a passage 22b, without passing through valves 40 and 50. The movable conical disc 7a of the drive pulley 7 is so designed that the pressure receiving area thereof is larger than that of movable conical disc 8a of the driven pulley 8. The line pressure control valve 40 comprises a valve body 41, spool 42, and chambers 41c and 41d. The spool 42 is applied with pressure of the pressurized oil supplied through a conduit 31 to the chamber 41c.

The other end of the spool 42 is applied with the force of a spring 43 provided between the end of the spool 42 and a retainer 45 the position of which is adjustable by a screw 44. The port 41a is communicated with a drain port 41b for a drain passage 27 in accordance with the position of a land of the spool 42. The drain port 41b communicates with oil reservoir 26 through passage 27.

The transmission ratio control valve 50 comprises a valve body 51, spool 52, spring 53 for urging the spool 52 in the downshift direction. A port 51b of the valve body 51 is selectively communicated with a pressure oil supply port 51a or a drain port 51c in accordance with the position of lands of spool 52. Port 51b communicates with chamber 9 through conduit 23, and port 51a communicates with port 41e of line pressure control valve 40 through conduit 22a. The drain port 51c is communicated with the oil reservoir 26 through a conduit 24 and a check valve 25.

The system is provided with a regulator valve 60, and solenoid operated on-off control valves 66 and 68.

The regulator valve 60 comprises a valve body 61, an inlet port 61a connected to the pump 21 through passages 37 and 22, a spool 62, an end chamber 61c connected to the passage 37, and a spring 63 urging the spool 62 to the chamber 61c. When the pressure of oil in the chamber 61c becomes higher than a set value, the spool 62 is shifted to the left, so that an inlet port 61a communicates with a drain port 61b to drain the oil. Thus, a constant pressure of oil is provided in the passage 37.

The passage 37 is communicated with the chamber 41d of line pressure control valve 40 through a constant pressure passage 38, orifice 65, solenoid operated on-off valve 66, and passage 32 having an accumulator 32a. Further, the passage 38 is communicated with an end chamber 51d of the transmission ratio control valve 50 through a passage 33, and with another end chamber 51e through a passage 34, orifice 67, and solenoid operated on-off valve 68. The solenoid operated on-off valve 66 is adapted to be operated by pulses. When energized, a valve 66a opens a drain port 66b. The pulsation of the pressure of oil in the passage 32 is smoothed by accumulator 32a. The solenoid operated on-off valve 68 is the same as valve 66 in construction and operation. The control valves 66 and 68 are operated by signals from a control unit 70. Thus, pressure controlled by the control valves 66 and 68 is applied to chambers 41d and 51e.

In the transmission ratio control valve 50, pressure receiving area of the spool 52 at chamber 51e is set to a value larger than the area at the chamber 51d. On the other hand, the control pressure in the chamber 51e can be changed between a maximum value, which is the same as the constant pressure in the chamber 51d, when the duty ratio is 0% and zero by controlling the duty ratio of pulses for operating the control valve 68. The transmission ratio control valve 50 is so arranged that the spool 52 is at a neutral position at a middle duty ratio (for example 50%) and is located in an oil supply position by increasing the duty ratio from the middle duty ratio because of reduction of control pressure in the chamber 51e. Further, the speed of the movement of the spool 52 changes with the magnitude of changing of the duty ratio. The spool 52 is shifted to an oil drain position by decreasing the duty ratio. It will be understood that when the oil is supplied to the chamber 9, the transmission is upshifted.

Figure 3:
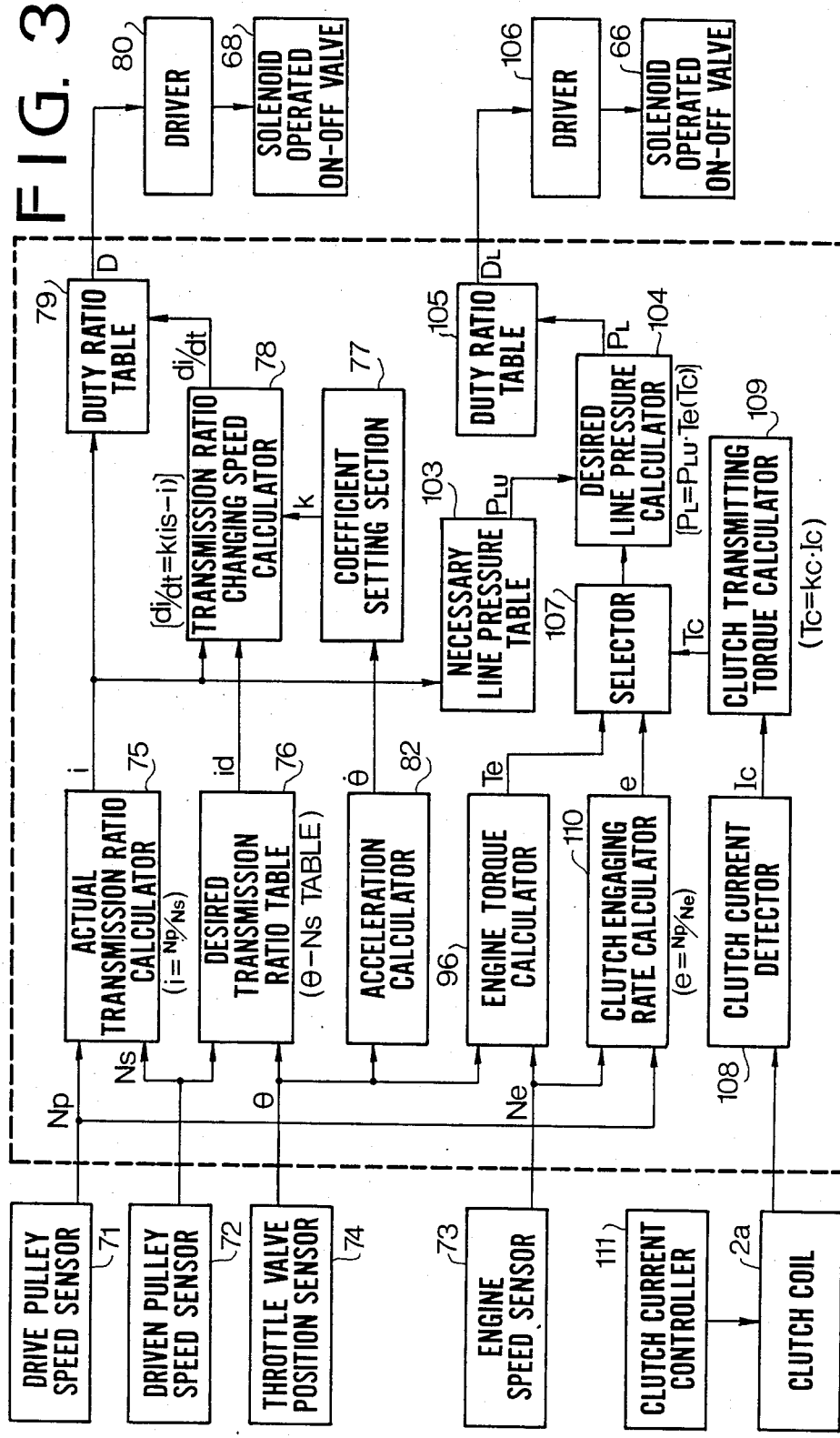
FIG. 3 is a block diagrams showing a control unit.

Referring to FIG. 3, a drive pulley speed sensor 71, driven pulley speed sensor 72, engine speed sensor 73 and throttle position sensor (or intake manifold pressure sensor) 74 are provided. Output signals $N_p$ and $N_s$ of sensors 71, 72 are fed to an actual transmission ratio calculator 75 to produce an actual transmission ratio i in accordance with $i=N_p/N_s$. Output signal $N_s$ and output signal $\theta$ of the throttle position sensor 74 are fed to a desired transmission ratio table 76. The desired transmission ratio id is obtained by the table 76 in accordance with the signals $N_s$ and $\theta$. On the other hand, the output signal $\theta$ is fed to an acceleration calculator 82 to obtain acceleration $\dot\theta$ of the throttle valve. The signal of the acceleration $\dot\theta$ is supplied to a coefficient setting section 77 to produce a coefficient K. The actual transmission ratio i, desired transmission ratio id and coefficient K from the coefficient setting section 77 are applied to a transmission ratio changing speed calculator 78 to produce a transmission ratio changing speed di/dt from the formula $di/dt = K(id - i)$.

The speed di/dt and actual ratio i are applied to a duty ratio signal generator 79 to generate the duty ratio D. The duty ratio D is supplied to the solenoid operated valve 68 through a driver 80.

Further, the output signal $\theta$ of throttle position sensor 74 and the output $N_e$ of engine speed sensor 73 are fed to an engine torque calculator 96, so that engine torque Te is calculated based on throttle position $\theta$ and engine speed Ne.

On the other hand, the actual transmission ratio i from the calculator 75 is applied to a necessary line pressure table 103 to derive a necessary line pressure $P_{LU}$ per unit torque. The necessary line pressure $P_{LU}$ is directly applied and the engine torque Te is applied, through a selector 107 to a desired line pressure calculator 104 where a desired line pressure $P_L$ is calculated ($P_L = P_{LU} \cdot Te$).

The desired line pressure $P_L$ is applied to a duty ratio table 105 to derive a duty ratio $D_L$ corresponding to the desired line pressure $P_L$. The duty ratio $D_L$ is supplied to a driver 106 which operates the solenoid operated on-off valve 66 at the duty ratio.

In the system of the present invention, a clutch current detector 108 is provided to detect clutch current $I_C$ flowing a clutch coil 2a of the clutch 2. The signal of clutch current $I_C$ is applied to a clutch transmitting torque calculator 109 to produce a clutch torque Tc. A clutch current controller 111 is provided to control the clutch current. Namely at the start of the vehicle, the clutch current is gradually increased up to a rated current as the accelerator pedal is depressed so as to smoothly start the vehicle. Accordingly, the clutch torque increases with the increase of the clutch current. The clutch torque Tc is calculated by a following formula at the calculator 109.

$$Tc = f(I_C) = K_C \cdot I_C (K_C \text{ a constant})$$

A clutch engaging rate calculator 110 is applied with the drive pulley speed signal $N_P$ and the engine speed signal Ne to calculate an engaging rate e ($e = N_P/Ne$). When the engaging rate e is smaller than one ($e < 1$), the clutch is being slip, and when $e = 1$, the clutch is entirely engaged (locked) by the rated current. The engine torque signal Te and the clutch torque signal Tc are applied to the selector 107. When $e < 1$, the clutch torque Tc is applied to the desired line pressure calculator 104 through the selector 107 in accordance with an engaging rate signal e from the engaging rate calculator 110.

In operation, while the vehicle is at a stop, chamber 10 of the driven pulley 8 is supplied with line pressure through passage 22b, and the chamber 9 of the drive pulley 7 is drained, since the $N_p$, $N_s$, $\theta$ are zero and duty ratio D is zero, and the spool 52 is at the right end position and the drain port 51c communicates with the chamber 9 through the conduit 23 as shown in FIGS. 2a and 2b. Thus, in the pulley and belt device of the continuously variable belt-drive transmission, the driving belt 11 engages with the driven pulley 8 at a maximum running diameter to provide the largest transmission ratio (low speed stage). When the accelerator pedal is depressed, the clutch current increases progressively with increase of engine speed. The electromagnetic clutch 2 is gradually engaged, transmitting the engine power to the drive pulley 7. The power of the engine is transmitted to the output shaft 6 at the largest transmission ratio by the driving belt 11 and driven pulley 8, and further transmitted to axles of the driving wheels 19. Thus, the vehicle is started.

When the throttle valve is opened for acceleration, the desired transmission ratio id and transmission ratio changing speed di/dt are calculated by calculators 76, 78, and duty ratio D is obtained from the duty ratio signal generator 79. The value of the duty ratio D is larger than the neutral value, so that the pressure in the chamber 51d of the control valve 50 is higher than the chamber 51e. Thus, the spool 52 is shifted to the left to communicate the port 51a with port 51b, so that oil is supplied to the chamber 9 through the conduit 23. On the other hand, duty ratio for the control valve 66 is reduced, thereby shifting the spool 42 of the valve 40 to the left. The port 41a communicates with the port 41b of the drain passage 27. Thus, line pressure reduces, and the transmission is upshifted, since oil is still supplied to the chamber 9 through the control valve 50. When the vehicle speed (output signal $N_s$) exceeds a predetermined value, the clutch 2 is entirely engaged.

The control operation of line pressure will be described hereinafter in detail with reference to FIGS. 2a, 2b and 3. As described above, the clutch torque Tc and engaging rate increase with an increase of the engine speed. During the engaging rate e is smaller than one, the clutch torque Tc is applied to desired line pressure calculator 104 through the selector 107. The calculator calculates a desired line pressure $P_L$ in dependence on the necessary line pressure $P_{LU}$ and clutch torque Tc ($P_L = P_{LU} \cdot Tc$). The solenoid operated on-off valve 66 is operated at a duty ratio $D_L$ corresponding to the desired line pressure $P_L$. The line pressure is applied to chamber 10 to hold the belt 11 at a necessary minimum force. Thus, the power of the engine is transmitted to driving wheels of the vehicle through the transmission without slipping of the belt. The line pressure increases with increase of the clutch torque.

When the vehicle speed exceeds a set value, the rated clutch current flows in the coil 2a to lock the clutch 2. At that time, the engaging rate e becomes one, so that the engine torque Te is selected by the selector 107. Accordingly, the desired line pressure is decided by the engine torque Te and necessary line pressure $P_{LU}$.

Thus, the desired line pressure $P_L$ is set to a large value when the engine torque is larger at a large transmission ratio. The desired line pressure decreases with decrease of the transmission ratio and with decrease of the engine torque so as to prevent disadvantages such as losses of operation of the pump and pulley, reduction of starting characteristic of the vehicle, and others.

While the presently referred embodiment of the present invention has been shown and described, it is to be understood that this disclosure is for the purpose of illustration and that various changes and modifications may be made without departing from the scope of the invention as set forth in the appended claims.

What is claimed is:

1. A control system for a continuously variable transmission for transmitting the power of an internal combustion engine to driving wheels of a motor vehicle, having a drive pulley including a hydraulically shiftable disc and a first hydraulic cylinder for shifting the disc, a driven pulley including a hydraulically shiftable disc and a second hydraulic cylinder for operating the disc, a belt engaged with both pulleys, a transmission ratio control valve having ports and a spool, a line pressure control valve having ports and a spool, a first hydraulic circuit having a pump for supplying oil to the first and second cylinders through the line pressure control valve and the transmission ratio control valve, the system comprising:

a clutch for transmitting torque of the engine to the transmission;

first means for shifting the spool of the line pressure control valve in dependence on operating conditions of the engine so as to provide a line pressure;

an engine speed sensor for producing an engine speed signal dependent on speed of the engine;

second means responsive to the engine speed signal for producing an engine torque signal dependent on output torque of the engine;

third means for producing a clutch torque signal dependent on the transmitting of the torque of the clutch;

detecting means for detecting engaging conditions of the clutch and for producing a clutch slipping signal when the clutch slips and producing a clutch engaging signal when the clutch is engaged;

selector means responsive to the clutch slipping signal for applying the clutch torque signal to the first means and responsive to the clutch engaging signal for applying the engine torque signal to the first means, whereby the line pressure is controlled in accordance with the engaging conditions of the clutch.

2. The control system according to claim 1 wherein the clutch is an electromagnetic clutch.

3. The control system according to claim 2 wherein the first means includes means responsive to the engine torque signal and clutch torque signal for producing a desired line pressure signal for deciding the quantity of the shifting of the spool of the line pressure control valve.

4. The system according to claim 2 wherein the first means comprises a second hydraulic circuit for applying oil to the transmission ratio control valve so as to shift the spool and a control valve responsive to the desired line pressure signal for controlling the supplied oil.

* * * * *